United States Patent
Hawes et al.

(10) Patent No.: US 10,179,607 B2
(45) Date of Patent: Jan. 15, 2019

(54) LANE KEEPING SYSTEM FOR AUTONOMOUS VEHICLE IN WIND CONDITIONS USING VEHICLE ROLL

(71) Applicant: APTIV TECHNOLOGIES LIMITED, St. Michael (BB)

(72) Inventors: Kevin J. Hawes, Greentown, IN (US); Michael I. Chia, Cicero, IN (US); Ehsan Samiei, Kokomo, IN (US); Walter K. Kosiak, Kokomo, IN (US)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 15/227,597

(22) Filed: Aug. 3, 2016

(65) Prior Publication Data

US 2018/0037259 A1 Feb. 8, 2018

(51) Int. Cl.
| | |
|---|---|
| *B62D 15/02* | (2006.01) |
| *G06T 7/70* | (2017.01) |
| *G01C 19/44* | (2006.01) |
| *G05D 1/00* | (2006.01) |
| *G05D 1/02* | (2006.01) |
| *B62D 6/04* | (2006.01) |
| *B62D 6/06* | (2006.01) |

(52) U.S. Cl.
CPC ............ *B62D 15/025* (2013.01); *B62D 6/04* (2013.01); *B62D 6/06* (2013.01); *B62D 15/021* (2013.01); *G01C 19/44* (2013.01); *G05D 1/0088* (2013.01); *G05D 1/0227* (2013.01); *G06T 7/70* (2017.01); *B60G 2400/0511* (2013.01); *B60G 2400/0516* (2013.01); *B60G 2400/05162* (2013.01); *B60G 2400/841* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 6,247,685 | B1 * | 6/2001 | Takahashi | .......... B60G 17/0162 188/322.15 |
| 7,610,131 | B2 * | 10/2009 | Kojima | .................. A63H 17/16 340/465 |
| 8,740,285 | B2 * | 6/2014 | Beckon | ................ B60Q 1/2661 296/180.1 |

(Continued)

FOREIGN PATENT DOCUMENTS

| | | |
|---|---|---|
| DE | 10 2004 033731 A1 | 2/2006 |
| WO | 00/38939 A1 | 7/2000 |
| WO | 2005/097578 A1 | 10/2005 |

*Primary Examiner* — Jean Paul Cass
(74) *Attorney, Agent, or Firm* — Lawrence D. Hazelton

(57) ABSTRACT

A lane keeping system for a vehicle includes a first roll angle sensor configured to provide a first signal indicative of dynamic vehicle body roll. A second roll angle sensor is configured to provide a second signal indicative of an angle between vehicle sprung and unsprung masses. A lane keeping system (LKS) controller is in communication with the first and second roll angle sensors. The LKS controller is configured to discern a vehicle roll angle in response to the first and second signals based upon effects of a lateral wind force on the vehicle. The LKS controller is configured to produce a correction in response to the determined lateral wind force effects to maintain the vehicle along a desired path.

20 Claims, 4 Drawing Sheets

(56) References Cited

U.S. PATENT DOCUMENTS

| | | | |
|---|---|---|---|
| 2007/0017735 A1* | 1/2007 | Kataoka | B62D 5/0463 |
| | | | 180/446 |
| 2009/0326816 A1* | 12/2009 | Park | G01C 21/165 |
| | | | 701/501 |
| 2010/0157058 A1 | 6/2010 | Feiden | |
| 2011/0166744 A1 | 7/2011 | Lu et al. | |
| 2012/0013277 A1* | 1/2012 | Ogawa | B60G 17/08 |
| | | | 318/368 |
| 2013/0009350 A1* | 1/2013 | Wolf-Monheim | B60G 11/32 |
| | | | 267/33 |
| 2014/0005889 A1* | 1/2014 | Hayakawa | B60G 17/01933 |
| | | | 701/38 |
| 2014/0353934 A1* | 12/2014 | Yabumoto | B60G 17/00 |
| | | | 280/5.515 |
| 2015/0183289 A1* | 7/2015 | Koumura | B60G 17/0161 |
| | | | 701/38 |
| 2015/0258975 A1* | 9/2015 | Koumura | B60W 40/11 |
| | | | 701/37 |
| 2015/0290995 A1* | 10/2015 | Kanda | B60G 17/0161 |
| | | | 701/37 |
| 2015/0343874 A1* | 12/2015 | Kurata | B60G 17/0195 |
| | | | 701/29.1 |
| 2016/0297522 A1* | 10/2016 | Brulez | B64C 39/024 |
| 2016/0339923 A1* | 11/2016 | Koumura | B60W 30/02 |
| 2017/0158015 A1* | 6/2017 | Kubota | B60G 17/015 |
| 2017/0243330 A1* | 8/2017 | Stec | G06T 5/003 |

* cited by examiner

LANE KEEPING SYSTEM FOR AUTONOMOUS VEHICLE IN WIND CONDITIONS USING VEHICLE ROLL

BACKGROUND

This disclosure relates to a lane keeping system in a fully autonomous vehicle or a vehicle that is driver-assisted. The disclosed system maintains the vehicle in its lane when subjected to differential lateral forces, such as when the vehicle is buffeted by winds.

During abnormally windy conditions a vehicle is buffeted causing discomfort to the driver and occupants. Wind disturbances may be steady, gusty, or caused by wind shadowed areas or passing vehicles. In all cases the vehicle is buffeted due to lateral wind pressure onto the vehicle. Wind gusts can induce lateral forces from zero to hundreds of pounds in short bursts or by slowly changing conditions. In some circumstances, lane deflection of 10-20 cm have been observed due to wind gusts.

A typical automated lane keeping system uses a closed loop system to maintain vehicle position relative to the lane while the vehicle is driven on a roadway. These systems have been improved upon by providing steering correction inputs due to wind forces, but they have been costly due to required additional components or have been difficult to implement.

There are systems that measure roll angle or lateral acceleration, but these systems do not offer a means of determining the effects of lateral wind forces on the vehicle specifically. Other systems measure roll angle, lateral acceleration or wind conditions, but do so to determine an optimal or new path rather than maintain the path desired by the occupant, much like an obstacle avoidance system.

SUMMARY

In one exemplary embodiment, a lane keeping system for a vehicle includes a first roll angle sensor configured to provide a first signal indicative of dynamic vehicle body roll. A second roll angle sensor is configured to provide a second signal indicative of an angle between vehicle sprung and unsprung masses. A lane keeping system (LKS) controller is in communication with the first and second roll angle sensors. The LKS controller is configured to discern a vehicle roll angle in response to the first and second signals based upon effects of a lateral wind force on the vehicle. The LKS controller is configured to produce a correction in response to the determined lateral wind force effects to maintain the vehicle along a desired path.

In a further embodiment of the above, a vision system sensor is in communication with the LKS controller and is configured to confirm accuracy of the vehicle roll angle.

In a further embodiment of any of the above, the vision system sensor includes a camera. The LKS controller is configured to confirm accuracy of the vehicle roll angle based upon video frames of the vehicle in relation to a roadway relative to a known horizon.

In a further embodiment of any of the above, the first roll angle sensor includes a gyroscope.

In a further embodiment of any of the above, the second roll angle sensor is a drivetrain that includes an axle that has an axle angle. The second roll angle sensor is configured to detect a change in the axle angle.

In a further embodiment of any of the above, the second roll angle sensor is a suspension system that includes laterally opposing suspension components that each provide a lateral suspension position. The second roll angle sensor is configured to detect a change in the lateral suspension positions.

In a further embodiment of any of the above, the LKS controller is configured to determine a difference between the second signal and the first signal. The difference corresponds to the determined lateral wind force effects.

In a further embodiment of any of the above, a steering system is in communication with the LKS controller. The LKS controller is configured to add a wind compensation value to a commanded steering angle to maintain the vehicle along the desired path and counteract the determined lateral wind force effects.

In a further embodiment of any of the above, the correction is a function of the vehicle roll angle, a difference between the unsprung and sprung masses, a vehicle speed, a steering ratio, a vehicle mass, and a suspension coefficient.

In another exemplary embodiment, a method of maintaining a vehicle along a desired path includes the steps of determining a vehicle dynamic body roll and determining an angle between vehicle sprung and unsprung masses. Effects of lateral wind force are discerned to produce a correction based upon the determining steps. A wind compensation value is added to a commanded steering angle based upon the correction.

In a further embodiment of any of the above, the determining steps include providing a vehicle roll angle and comprising the step of confirming accuracy of the vehicle roll angle.

In a further embodiment of any of the above, the step of determining a vehicle lateral orientation relative to a horizon to confirm the accuracy of the vehicle roll angle provided by first and second roll angle sensors associated with the determining steps.

In a further embodiment of any of the above, the horizon is determined based upon video frames of the vehicle from a camera in relation to a roadway relative to a known horizon.

In a further embodiment of any of the above, the vehicle dynamic body roll determining step is performed using an inertial measurement unit.

In a further embodiment of any of the above, the inertial measurement unit includes a gyroscope.

In a further embodiment of any of the above, the angle determining step is performed using a second roll angle sensor. The second roll angle sensor is a drivetrain that includes an axle that has an axle angle. The second roll angle sensor is configured to detect a change in the axle angle.

In a further embodiment of any of the above, angle determining step is performed using a second roll angle sensor. The second roll angle sensor is a suspension system that includes laterally opposing suspension components that each provide a lateral suspension position. The second roll angle sensor is configured to detect a change in the lateral suspension positions.

In a further embodiment of any of the above, a lane keeping system (LKS) controller is configured to quantify a difference between the determining steps. The difference corresponds to the discerned lateral wind force effects.

In a further embodiment of any of the above, a steering system is in communication with the LKS controller. The LKS controller is configured to add a wind compensation value to a commanded steering angle to maintain the vehicle along a desired path and counteract the discerned lateral wind force effects.

In a further embodiment of any of the above, the correction is a function of the vehicle roll angle, a difference between the unsprung and sprung masses, a vehicle speed, a steering ratio, a vehicle mass, and a suspension coefficient.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

With the introduction of partially or fully automated vehicle control, the capability exists for enhanced vehicle control and safety using lateral force sensing. By using lateral force sensing, the vehicle path can proactively adjust to lateral disturbances rather than simply reacting after the lateral force has drifted the vehicle off course. Wind correction data is available instantaneously as opposed to a reactionary system, which for an autonomous system, may be hundreds of milliseconds delay.

The disclosed system and method improves vehicle comfort by using first and second roll angle sensors and a control system that makes corrections to the steering angle before the vehicle drifts off course due to lateral wind forces. A vision system can also be used to confirm the accuracy of the roll angle from the roll angle and lateral acceleration sensors. The lateral wind detection can be used to reduce user-provided wind steering counter-torque in modern manual torque assist steering systems, for example, as part of a lane keeping system or an autonomously operated vehicle.

Figure 1:
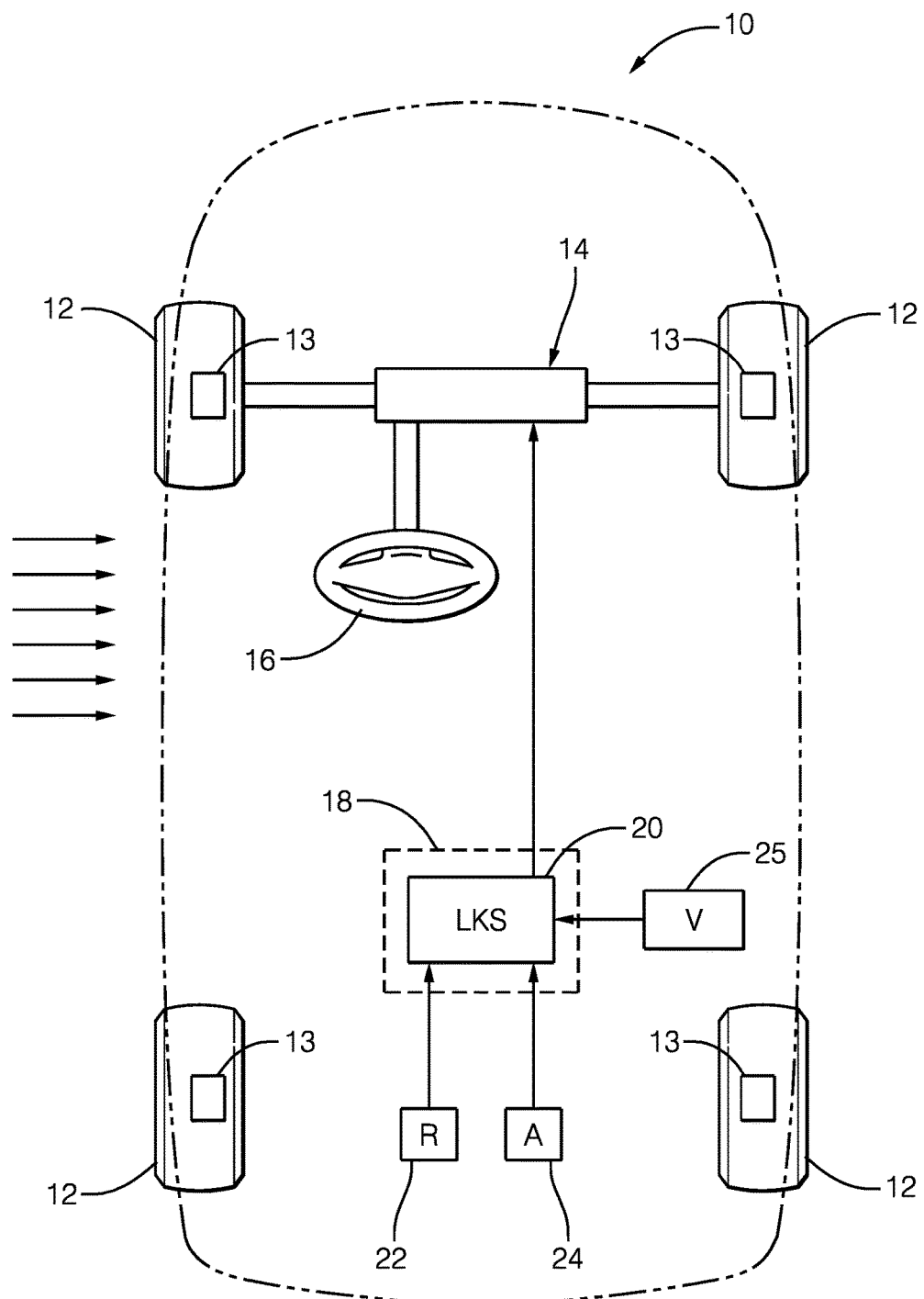
FIG. 1 is a schematic view of a vehicle with a lane keeping system relating to lateral wind forces.

Referring to FIG. 1, a vehicle 10 is shown in a highly schematic manner. The vehicle 10 includes wheels 12 supported by a suspension 13, which may be any suitable suspension configuration. In one example, the suspension 13, which can include hydraulic, pneumatic and/or mechanical damping and spring elements, is of the type that can be actively stiffened or softened during vehicle operation or provide a change in ride height.

A torque assist steering system 14 is shown that is configured to steer the front wheels 12, but all-wheel or rear-wheel steering may be provided instead, if desired. A driver provides a steering input to a steering wheel 16 to obtain a desired path for the vehicle. It should be understood that the vehicle 10 may be any type of vehicle with any suitable configuration.

A lateral wind force (horizontal arrows) acts on a side of the vehicle 10, which creates a high pressure relative to a pressure on the other side of the vehicle 10. This lateral wind force, if sufficiently large, may require the operator to provide a corrective steering input to the steering system 14 to maintain the vehicle 10 along a desired path. In the case of a lane keeping system or an autonomous vehicle, the lateral wind force may require the steering system 14 to provide a steering angle correction, without any input from the vehicle operator, in order to maintain a desired path corresponding to the requested vehicle path by the driver at the steering wheel 16.

Figure 2:
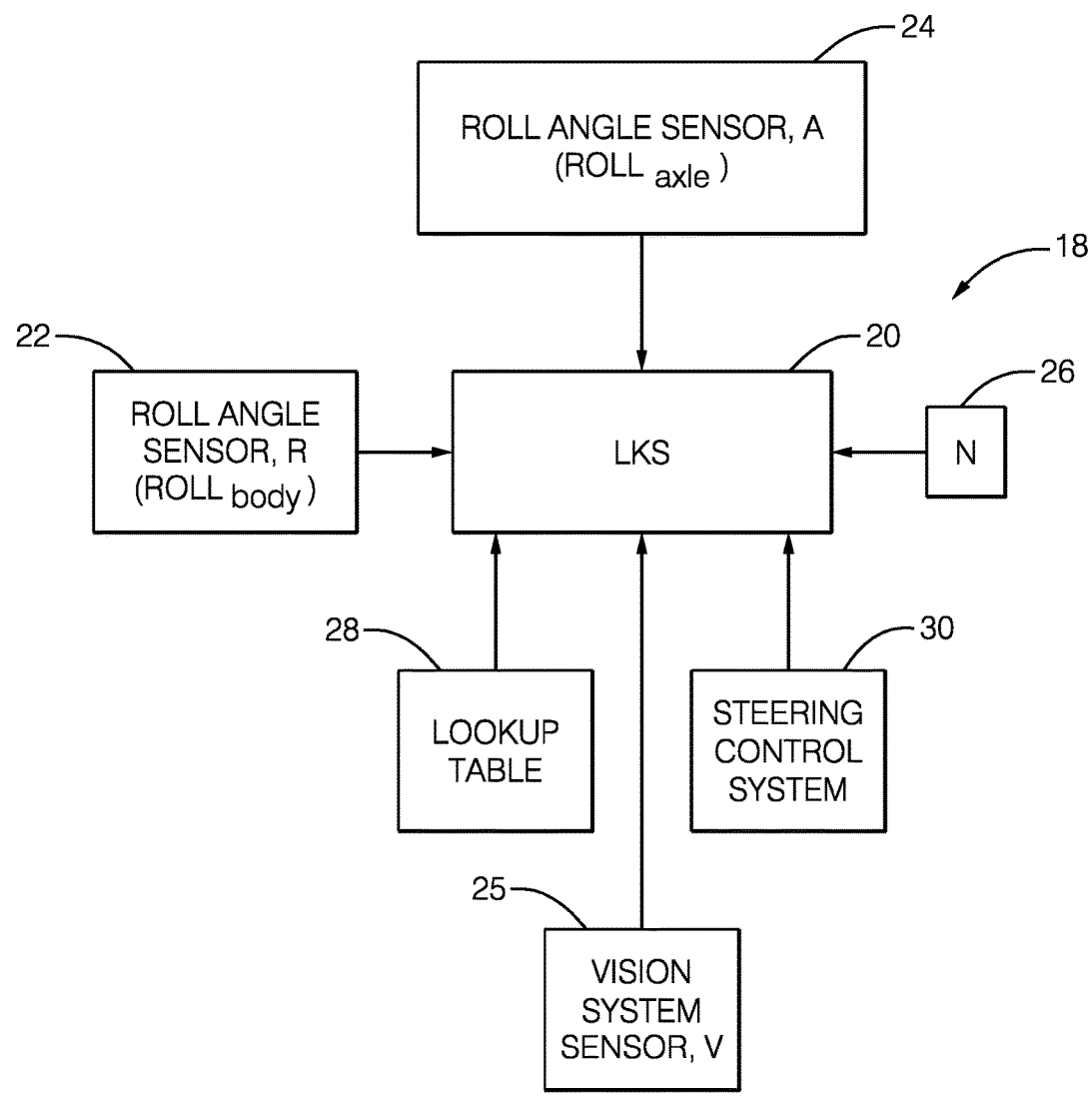
FIG. 2 is a schematic view of the lane keeping system with various inputs.

Referring to FIGS. 1 and 2, a controller 18 includes a lane keeping system (LKS) controller 20 in communication with steering control system 30 that commands the steering system 14. The controller 18 can be a single processor, or may comprise multiple processors distributed in the vehicle 10.

A first roll angle sensor 22 is in communication with the LKS controller 20 and is configured to provide a first signal ($ROLL_{body}$) indicative of vehicle body roll angle R, such as by dynamically measuring vehicle body roll with a gyroscope in an inertial measurement unit. A lateral acceleration measurement may be used in addition to or instead of measuring roll to determine the vehicle body roll angle. However, the first signal may not be entirely attributable to vehicle roll due to the wind forces that force the vehicle from its desired path.

A second roll angle sensor 24 is in communication with the LKS controller 20 and can be used to generate a second signal $ROLL_{axle}$, which provides additional vehicle roll information relating to a position or angle A of an unsprung mass (i.e., wheels and suspension) relative to a sprung mass (i.e., vehicle body).

An active suspension system may include sensors from which vehicle roll information can be inferred. Laterally opposing suspension components may each provide a lateral suspension position, and the second roll angle sensor may be configured to detect a change in the lateral suspension positions, which can indicate changes in road angle 34 due to bumps 32 or dips in the roadway 38 (FIG. 3B). In another example, at least several of the wheels 12 are driven by one or more axles, as is typical. As the vehicle 10 moves about its roll axis, the angle A changes. Such a configuration can also provide vehicle roll information. While irregularities in the roadway can affect the vehicle's path, these irregularities will not necessarily apply the same type of lateral forces to the vehicle as wind. Thus, detecting movement between the vehicle's sprung and unsprung masses can be used to isolate changes in the vehicle's body roll angle due to wind forces, which will provide a more accurate determination of vehicle body roll angle due to wind forces. Thus, a desired steering angle correction can be tailored to address the wind's effects on steering. Information from the first and second sensors can also be used to correct for steering disturbances due to large road camber changes if desired.

Figure 3A:
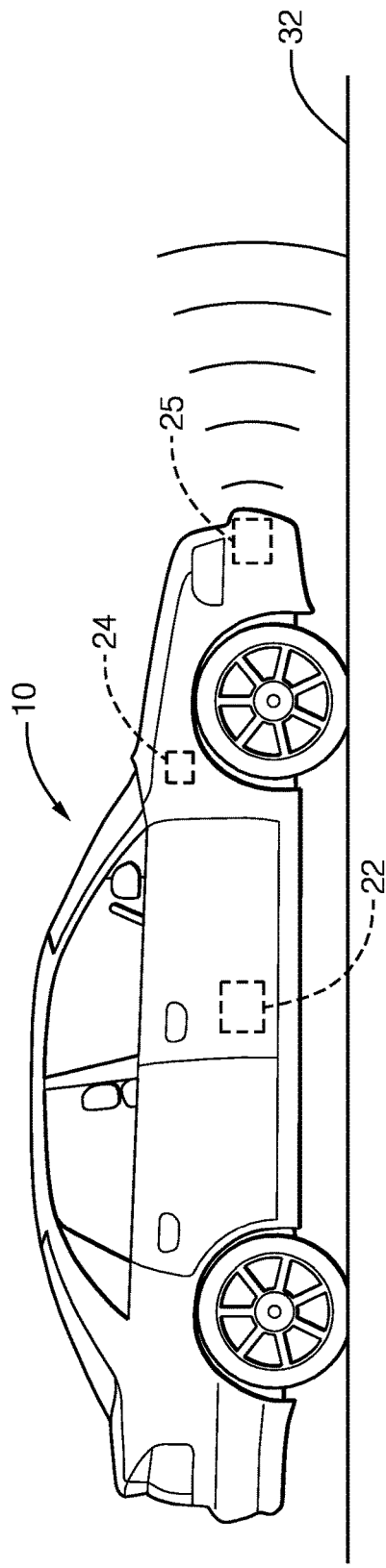
FIG. 3A is a schematic side view of the vehicle.
Figure 3B:
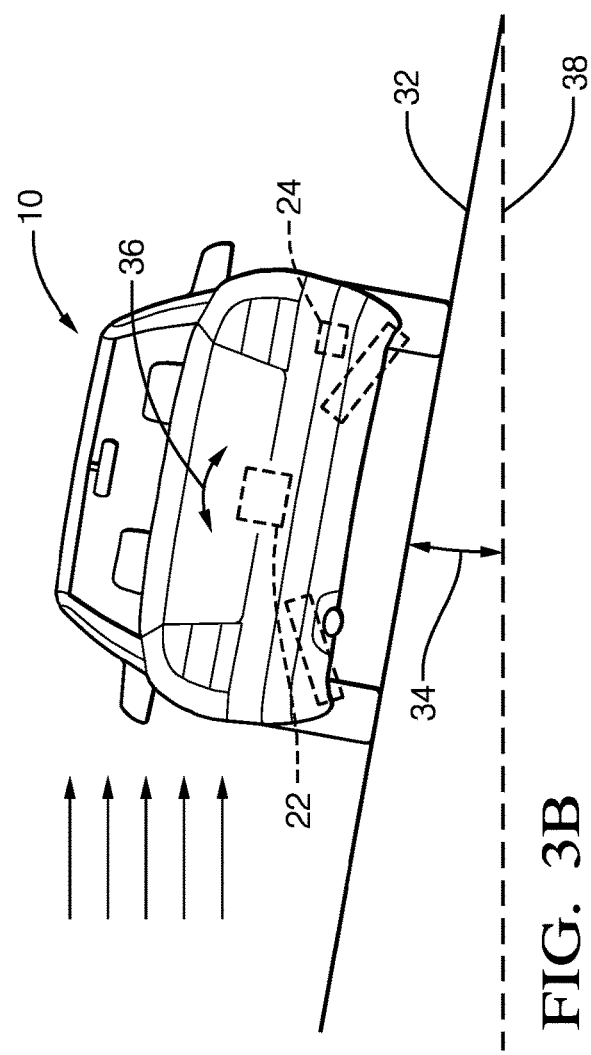
FIG. 3B is a schematic rear view of the vehicle shown in FIG. 3A.

A sensor 25 from a vision system provides a signal V that provides the roll angle of the vehicle on the roadway 32 relative to a horizon 38, as shown in FIGS. 3A and 3B. The horizon 38 corresponds to a level surface. In one example, the sensor 25 is a forward- or rear-facing camera, which can be used to determine a vehicle body roll angle based upon video frames of the vehicle 10 in relation to a roadway relative to the horizon or rotational component of the imagery. It should be understood that other devices may be used to determine the vehicle lateral orientation, such as radar or LIDAR. The sensor 25 can also detect uneven surfaces, such as drop offs or bumps, which may create a lateral force that is not attributable to lateral wind forces, thus confirming information provided by the first and second sensors 22, 24. If the vision system reveals a discrepancy in the detected vehicle will angle then information from the camera may be used instead of the $1^{st}$ sensor, for example.

The LKS controller 20 is configured to discern effects of a lateral wind force on the vehicle in response to the first and second signals, for example, by determining the difference between the second signal and the first signal. The difference corresponds to the determined lateral wind force effects, taking out the effects of dips and bumps in the roadway. The LKS controller 20 is configured to produce a correction in response to the determined lateral wind force effects to maintain the vehicle along a desired path, which is requested by the driver via the steering wheel 16 by commanding a steering control system 30 in communication with the steering system 14. The LKS controller 20 is configured to add a wind compensation value to a commanded steering angle to maintain the vehicle along the desired path and counteract the determined wind force.

Referring to FIG. 2, vehicle speed (N) 26 and other variables may be used by the LKS controller 20 to determine the wind compensation value. Other variables may include a steering ratio ($STEERING_{ratio}$), a vehicle mass (m), and a suspension coefficient ($C_{suspension}$), and/or other vehicle dynamic characteristics. These variables may be provided to the LKS controller 20 as part of a look-up table 28.

Figure 4:
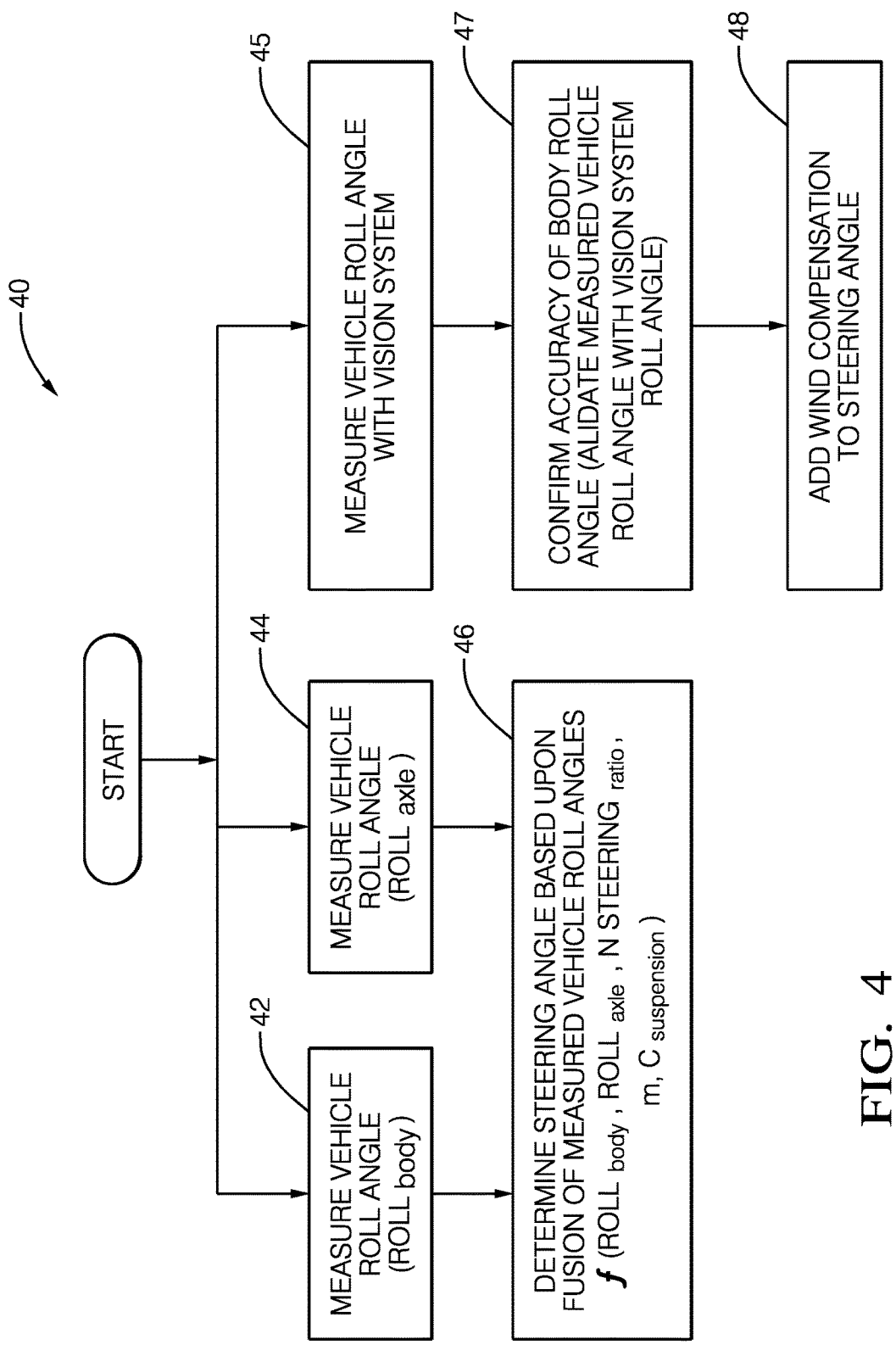
FIG. 4 is a flowchart depicting a method of lane keeping using the system shown in FIGS. 1-2.

An example method 40 of lane keeping is shown in FIG. 4. A vehicle body roll angle ($ROLL_{body}$) is measured (block 42), and a roll angle corresponding to a difference between the unsprung and sprung masses ($ROLL_{axle}$) is measured (block 44). The correction needed to maintain the vehicle along the desired path is a function of the vehicle roll angle $ROLL_{body}$, the difference between the unsprung and sprung masses $ROLL_{axle}$, the vehicle speed N, the steering ratio $STEERING_{ratio}$, the vehicle mass m, and the suspension coefficient $C_{suspension}$ (block 46). This function is unknown, but can be identified using, for example, a fifth order system structure and an iterative least squares method (or similar method) to determine the unknown system coefficients. Additional or different vehicle dynamic characteristics may be used, if desired.

A vehicle roll angle is also measured using the vehicle's vision system (block 45), which is used to confirm the accuracy of the determined steering angle correction (block 47). A wind compensation value is added to the commanded steering angle based upon the correction (block 48) if the vision system validates the steering angle correction based upon the fusion between the measured vehicle roll angles from the first and second sensors 22, 24. The steering correction is applied in the opposite direction of the measured roll angle to compensate for unwanted steering disturbances due to wind and large road camber changes.

The disclosed lane keeping system and method proactively discerns the lateral wind forces from other forces on the vehicle and compensates for those wind forces that would cause the vehicle to deviate from the desired path. Confirmation of the wind-related vehicle roll can be provided using the vehicle's vision system.

The disclosed controller 18 may include a processor and non-transitory memory where computer readable code for controlling operation is stored. In terms of hardware architecture, such a controller can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 18 may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. Finally, the input/output devices may further include devices that communicate both as inputs and outputs, for instance but not limited to, a modulator/demodulator (for accessing another device, system, or network), a radio frequency (RF) or other transceiver, a bridge, a router, etc.

When the controller 18 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A lane keeping system for a vehicle comprising:
a first roll angle sensor configured to provide a first signal indicative of dynamic vehicle body roll;
a second roll angle sensor configured to provide a second signal indicative of an angle between vehicle sprung and unsprung masses; and
a lane keeping system (LKS) controller in communication with the first and second roll angle sensors, the LKS controller configured to discern a vehicle roll angle in response to the first and second signals based upon effects of a lateral wind force on the vehicle, the LKS controller configured to produce a correction in response to the determined lateral wind force effects to maintain the vehicle along a desired path.

2. The system according to claim 1, comprising a vision system sensor in communication with the LKS controller and configured to confirm accuracy of the vehicle roll angle.

3. The system according to claim 2, wherein the vision system sensor includes a camera, and the LKS controller is configured to confirm accuracy of the vehicle roll angle based upon video frames of the vehicle in relation to a roadway relative to a known horizon.

4. The system according to claim 1, wherein the first roll angle sensor includes a gyroscope.

5. The system according to claim 1, wherein the second roll angle sensor is a drivetrain that includes an axle having an axle angle, and the second roll angle sensor is configured to detect a change in the axle angle.

6. The system according to claim 1, wherein the second roll angle sensor is a suspension system that includes laterally opposing suspension components that each provide a lateral suspension position, and the second roll angle sensor is configured to detect a change in the lateral suspension positions.

7. The system according to claim 1, wherein the LKS controller is configured to determine a difference between the second signal and the first signal, the difference corresponding to the determined lateral wind force effects.

8. The system according to claim 1, comprising a steering system in communication with the LKS controller, the LKS controller configured to add a wind compensation value to a commanded steering angle to maintain the vehicle along the desired path and counteract the determined lateral wind force effects.

9. The system according to claim 8, wherein the correction is a function of the vehicle roll angle, a difference between the unsprung and sprung masses, a vehicle speed, a steering ratio, a vehicle mass, and a suspension coefficient.

10. A method of maintaining a vehicle along a desired path comprising the steps of:
determining a vehicle dynamic body roll from a first roll angle sensor;
determining an angle between vehicle sprung and unsprung masses from a second roll angle sensor;
discerning effects of lateral wind force to produce a correction based upon the determining steps; and
adding a wind compensation value to a commanded steering angle based upon the correction.

11. The method according to claim 10, wherein the determining steps include providing a vehicle roll angle, and comprising the step of confirming accuracy of the vehicle roll angle.

12. The method according to claim 11, comprising the step of determining a vehicle lateral orientation relative to a horizon to confirm the accuracy of the vehicle roll angle provided by first and second roll angle sensors associated with the determining steps.

13. The method according to claim 12, wherein the horizon is determined based upon video frames of the vehicle from a camera in relation to a roadway relative to a known horizon.

14. The method according to claim 10, wherein the vehicle dynamic body roll determining step is performed using an inertial measurement unit.

15. The method according to claim 14, wherein the inertial measurement unit includes a gyroscope.

16. The method according to claim 10, wherein angle determining step is performed using a second roll angle sensor, the second roll angle sensor is a drivetrain that includes an axle having an axle angle, and the second roll angle sensor is configured to detect a change in the axle angle.

17. The method according to claim 10, wherein the second roll angle sensor is a suspension system that includes laterally opposing suspension components that each provide a lateral suspension position, and the second roll angle sensor is configured to detect a change in the lateral suspension positions.

18. The method according to claim 10, wherein a lane keeping system (LKS) controller is configured to quantify a difference between the determining steps, the difference corresponding to the discerned lateral wind force effects.

19. The method according to claim 18, comprising a steering system in communication with the LKS controller, the LKS controller configured to add a wind compensation value to a commanded steering angle to maintain the vehicle along a desired path and counteract the discerned lateral wind force effects.

20. The method according to claim 19, wherein the correction is a function of the vehicle roll angle, a difference between the unsprung and sprung masses, a vehicle speed, a steering ratio, a vehicle mass, and a suspension coefficient.

* * * * *